US008786771B2

(12) United States Patent
Wang et al.

(10) Patent No.: US 8,786,771 B2
(45) Date of Patent: Jul. 22, 2014

(54) CAMERA MODULE

(75) Inventors: Wen-Chih Wang, Tu-Cheng (TW);
Ming-Yu Deng, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 308 days.

(21) Appl. No.: 13/118,485

(22) Filed: May 30, 2011

(65) Prior Publication Data
US 2012/0229690 A1    Sep. 13, 2012

(30) Foreign Application Priority Data

Mar. 7, 2011 (CN) .......................... 2011 1 0053499

(51) Int. Cl.
*H04N 5/225* (2006.01)
(52) U.S. Cl.
USPC .......................................................... 348/374
(58) Field of Classification Search
USPC .......................................................... 348/374
See application file for complete search history.

(56) References Cited

U.S. PATENT DOCUMENTS

| 8,072,538 B2* | 12/2011 | Higuchi | 348/374 |
| 8,159,595 B2* | 4/2012 | Shiraishi | 348/340 |
| 2010/0013985 A1* | 1/2010 | Chang | 348/374 |
| 2012/0105713 A1* | 5/2012 | Luan | 348/374 |

\* cited by examiner

*Primary Examiner* — Anthony J Daniels
(74) *Attorney, Agent, or Firm* — Novak Druce Connolly Bove + Quigg LLP

(57) ABSTRACT

A camera module includes a lens module, a circuit board, an image sensor, a lens holder and a filter. The lens holder includes a hollow main body and a bottom base connected to the main body. The main body is connected to the lens module. The bottom base defines a receiving cavity. A sidewall of the bottom based defines at least one mounting hole close to the hollow main body and communicating with the receiving cavity. The filter is positioned on the bottom base and received in the receiving cavity. The at least one mounting hole is configured for allowing the filter to enter into the receiving cavity or be taken out of the receiving cavity. The circuit board is positioned on the bottom base. The image sensor is received in the receiving cavity and electrically connected to the circuit board.

3 Claims, 3 Drawing Sheets

CAMERA MODULE

BACKGROUND

1. Technical Field

The present disclosure relates to a camera module and a method for assembling such camera module.

2. Description of Related Art

With the development of optical imaging technology, camera modules are widely used in a variety of portable electronic devices, such as mobile phones, digital cameras, and personal digital assistants (PDAs). After assembling the camera module, it is needed to detect whether there are contaminants or other factors affecting the imaging quality of the camera module.

Referring to FIG. 1, a typical camera module 100 includes a circuit board 11, an image sensor 12 arranged on the circuit board 11, a lens holder 13, a lens module 15, and a filter 16. The lens holder 13 includes a hollow main body 131 and a bottom base 133 connected to the hollow main body 131. A bottom end of the bottom base 133 is away from the hollow main body 131, and is securely connected to the circuit board 11. The image sensor 12 is received in the bottom base 133, and is electrically connected to the circuit board 11. The lens module 15 includes a lens barrel 151 and a lens 152 received in the lens barrel 151. The filter 16 is received in the bottom base 133. Normally, for cleaning the filter 16, the image sensor 12, or other elements in the bottom base 133, the lens holder 13 must be removed first from the circuit board 11. However, the removal of the lens holder 13 from the circuit board 11 is not only troublesome, and time-consuming, but also may damage the lens module 15, the filter, or lens holder 13. Accordingly, manufacturing cost of the camera module is higher.

Therefore, what is needed is a new camera module and a method for assembling the camera module that can overcome the described limitations.

DETAILED DESCRIPTION

Embodiments will now be described in detail below with reference to drawings.

Figure 1:
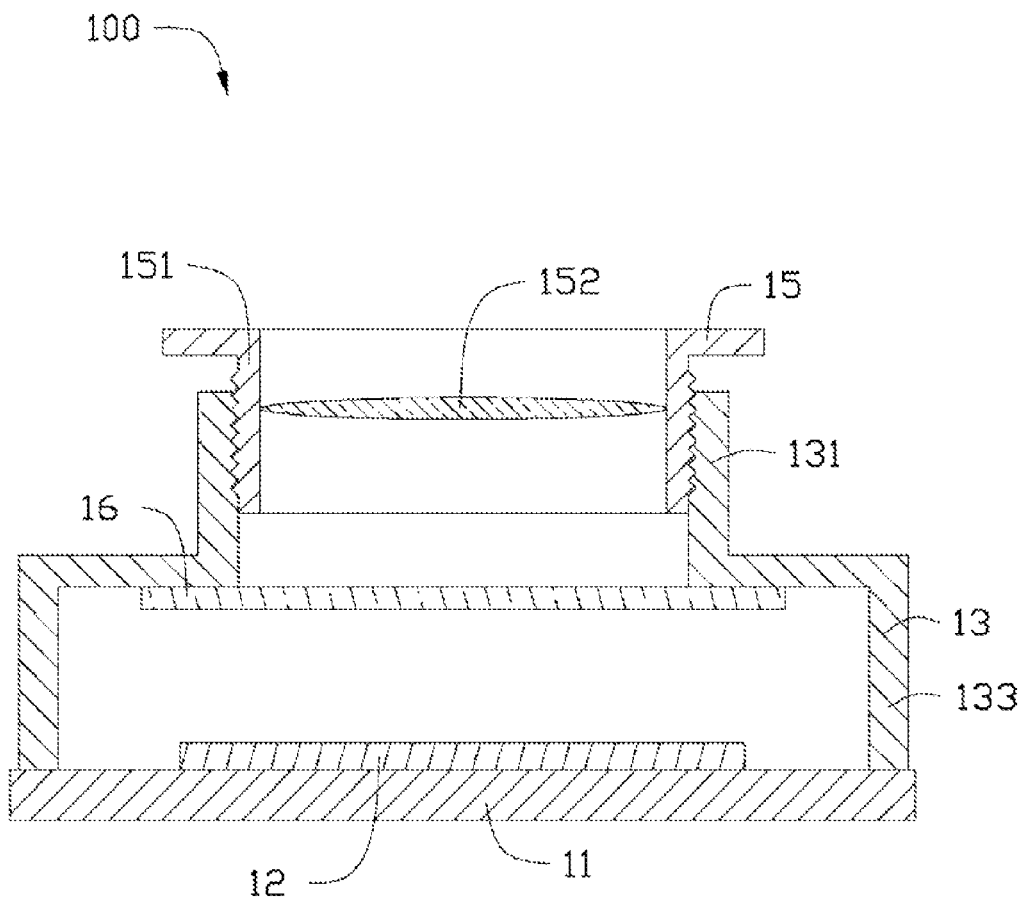
FIG. 1 is an isometric view of a camera module of a related art.
Figure 2:
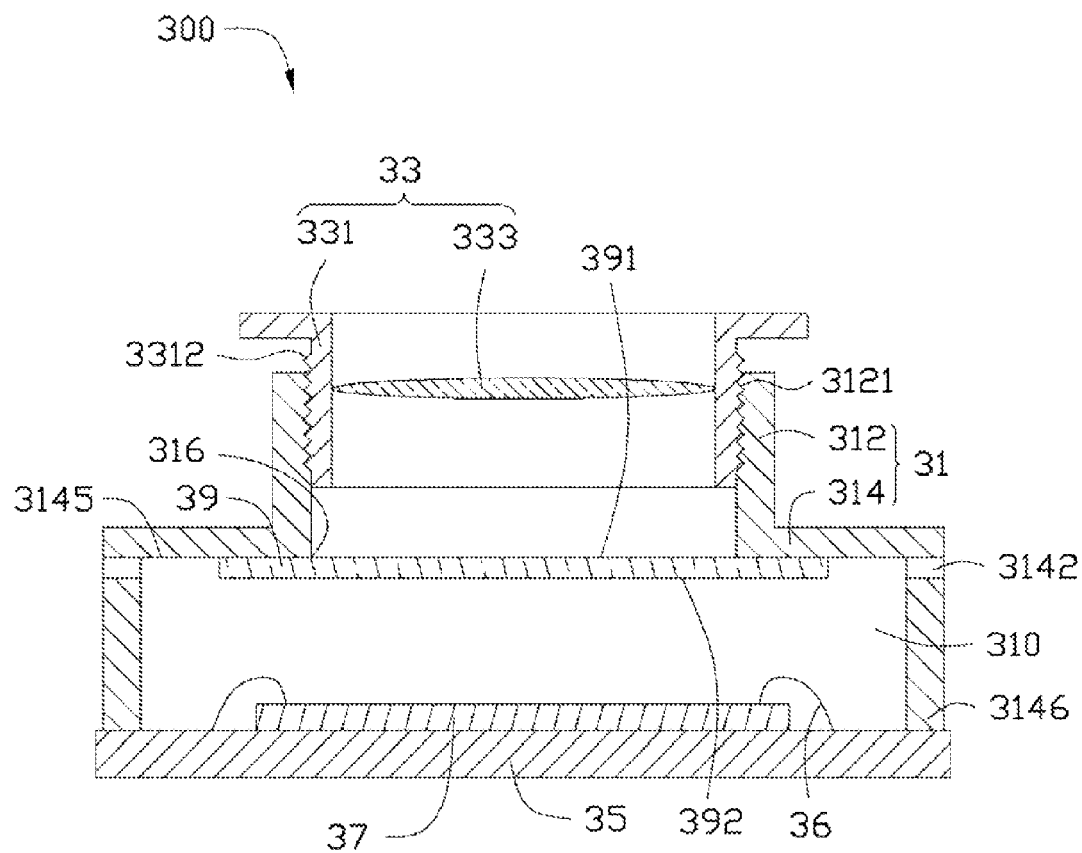
FIG. 2 is an isometric view of a camera module according to an exemplary embodiment.

Referring to FIG. 2, a camera module 300, in accordance with an exemplary embodiment, includes a lens holder 31, a lens module 33 received in the lens holder 31, a circuit board 35, an image sensor 37 arranged on the circuit board 35, and a filter 39 arranged on the lens holder 31.

The lens holder 31 includes a hollow main body 312 and a hollow bottom base 314 connected to the main body 312. An inner wall of the main body 312 defines a plurality of inner threads 3121.

The bottom base 314 defines a receiving cavity 310 for receiving the image sensor 37 and the filter 39. The bottom base 314 includes an inner top surface 3145 facing the receiving cavity 310 and close to the main body 312. The top surface 3145 is configured for fixing the filter 39. The top surface 3145 defines a through hole 316 communicating with the main body 312 and the receiving cavity 310, such that the receiving cavity 310 communicates with the main body 312. A sidewall of the bottom base 314 defines at least one mounting hole 3142 communicating with the receiving cavity 310 and close to the top surface 3145. The at least one mounting hole 3142 is configured for allowing the filter 19 to be inserted into or be taken out of the receiving cavity 310. In the present embodiment, the at least one mounting hole 3142 is two opposite mounting holes 3142. In other embodiments, the at least mounting hole 3142 may be three, four, or more mounting holes 3142.

The lens module 33 includes a lens barrel 331 and at least one lens 333 received in the lens barrel 331. An outer surface of the lens barrel 331 defines a plurality of outer threads 3312 engaged with the inner threads 3121, such that the lens barrel 331 can be securely fixed in the main body 312. In the present embodiment, the at least one lens 333 is a lens. In other embodiments, the at least one lens 333 may be two, three, or more lenses.

The circuit board 35 is fixed on a bottom end 3146 of the bottom base 314, and is opposite to the top surface 3145, such that a closed cavity (not labeled) is cooperatively defined by the circuit board 35, the lens module 33, and the lens holder 31. The bottom end 3146 is far away from the main body 312. The circuit board 35 may be a printed circuit board, a flexible circuit board, flex-rigid circuit board, or other circuit boards. If the circuit board 35 is a flexible circuit board, a more rigid circuit board may be provided, and the circuit board 35 can be arranged on the more rigid circuit board.

The image sensor 37 is arranged on the circuit board 35, and is received in the receiving cavity 310. The image sensor 37 is electrically connected to the circuit board 35 with electric wires 36. The image sensor 37 may be a charge-coupled device (CCD) or a complementary metal-oxide-semiconductor (CMOS) active pixel sensor. The image sensor 37 may be electrically connected to the circuit board by flip-chip technology, thermosonic bonding, inner lead bonding, tape automatic bonding, or other bonding methods.

In the present embodiment, the filter 39 is an infrared cut-off filter, and is configured for blocking infrared light due to the high sensitivity of the image sensor 37 to near-infrared light. The filter 39 is fixed on the top surface 3145 and aligned with the two mounting holes 3142. The filter 39 is inserted into the receiving cavity 310 from the mounting holes 3142. When the filter 39 is needed to be removed from the bottom base 314, the filter 39 can also be taken out of the bottom base 314 from the mounting holes 3142. The filter 39 may be securely arranged on the top surface 3145 by thermosetting adhesive, hot melt adhesive, twin adhesive, UV curing adhesive, silica sol, or other bond materials.

An incident light passes through the at least one lens 333 of the lens module 33, the through hole 316, and the filter 39 in that order, and finally reaches the image sensor 37. The image sensor 37 converts an optical signal to an electric signal, and transmits the electric signal to the circuit board 35.

In alternative embodiments, the filter 39 may be round, square, pentagon, or other shapes. In further alternative embodiments, the edge of the filter 37 may be fixed in the mounting holes 3142.

Figure 3:
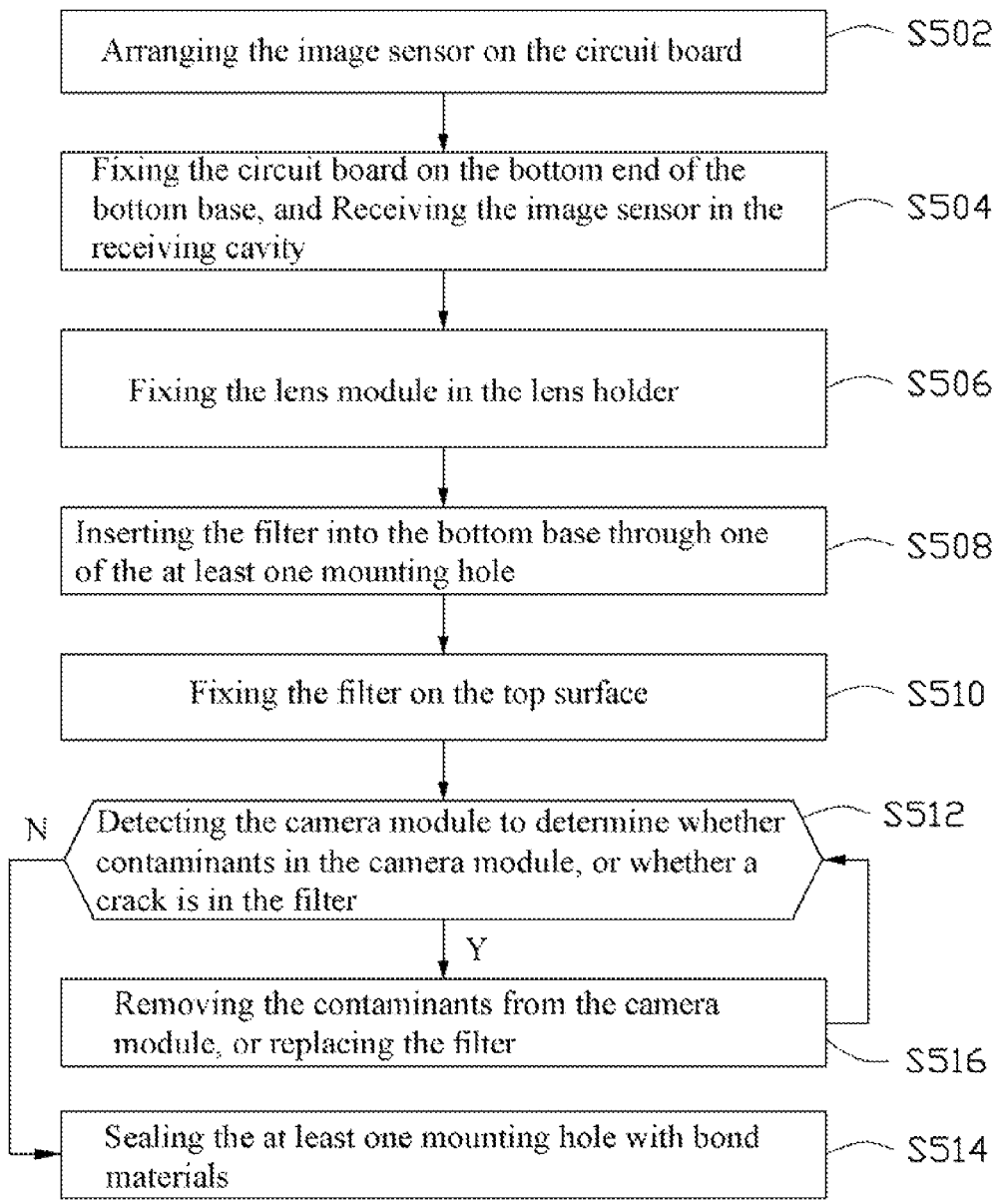
FIG. 3 is a flow chart of a method for assembling the camera module in FIG. 2.

Referring to FIG. 3, an assembly method of the camera module 300 is provided.

In step S502, the image sensor 37 is fixedly arranged on the circuit board 325.

In step S504, the circuit board 35 is securely fixed on the bottom end 3146 of the bottom base 314, and the image sensor 37 is received in the receiving cavity 310.

In step S506, the lens module 33 is securely fixed in the lens holder 31 by the engagement of the inner threads 3121 and the outer threads 3312.

In step S508, the filter 39 is inserted into the bottom base 314 through one of the at least one mounting hole 3142.

In step S510, the filter 39 is fixed on the top surface 3145.

In step S512, the camera module 300 is detected to determine whether contaminants are in the camera module 300 or whether a crack is in the filter 39. If there are no contaminants in the camera module 300, and there is no crack in the filter 39, then step S514 (see details below) is performed. If there are contaminants in the camera module 300, or there is a crack in the filter 39, step S516 (see details below) is performed first, and step S512 is then performed again.

In step S514, the mounting holes 3142 are sealed with bond materials, such as thermosetting adhesive, hot melt adhesive, twin adhesive, UV curing adhesive, or silica sol.

In step S516, the contaminants are removed from the camera module 300, or the filter 39 is replaced with a new filter. When contaminants are detected in the main body 312, or contaminants are detected on the top surface 391 of the filter 39, the lens module 33 can be removed first from the main body 312, and then the main body 312 or the top surface 391 of the filter 39 can be cleaned. When contaminants are detected on the bottom surface 392 of the filter 39, a removal tool (not shown) is inserted in the mounting hole 3142, and presses against the filter 39, and then the filter 39 can be removed from the top inner surface 3145. Accordingly, the filter 39 can be taken out of the lens holder 31 through the mounting hole 3142, and the bottom surface 392 of the filter 39 can be cleaned; or a cleaning tool (not shown) is inserted in the receiving cavity 310 to remove contaminants from the bottom surface 392. When contaminants are detected in the receiving cavity 310, the lens module 33 can be removed from the lens holder 31, the filter 39 can be taken out of lens holder 31 through the mounting hole 3142, and the receiving cavity 310 can thus be cleaned without being blocked by the lens module 33 and the filter 39. When a crack is in the filter 39, or an irremovable contaminant is on the filter 39, the filter 39 should be replaced with a new filter. In such case, the filter 39 can be taken out of the lens holder 31 through the mounting hole 3142, and a new filter can be inserted into the lens holder 31 through the mounting hole 3142 to replace the filter 39.

The camera module 300 includes at least one mounting hole 3142, and the filter 39 can be taken out of or inserted into the lens holder 31 from the at least one mounting hole 3142. Accordingly, without removing the lens holder 31 from the circuit board 35, the receiving cavity 310, the filter 39, or the surface of the image sensor 39 can be cleaned. In addition, if the filter 39 has a crack or an irremovable contaminant, the filter 39 can be taken from the lens holder 31 through the mounting hole 3142, and a new filter can be inserted into the lens holder 31 through the mounting hole 3142. The assembly efficiency of the camera module 300 can thus be improved, and the manufacturing cost of the camera module 300 can be lowered.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A camera module comprising:
a lens module comprising a lens barrel and at least one lens received in the lens barrel;
a lens holder comprising a hollow main body and a bottom base connected to the main body, the main body being connected to the lens barrel, the bottom base defining a receiving cavity, a sidewall of the bottom base defining at least one mounting hole close to the main body and communicating with the receiving cavity;
a filter positioned on the bottom base and received in the receiving cavity, the at least one mounting hole being configured for allowing the filter to be inserted into the receiving cavity or allowing the filter to be taken out of the receiving cavity;
a circuit board positioned on the bottom base; and
an image sensor received in the receiving cavity and electrically connected to the circuit board;
wherein the bottom base comprises an inner top surface facing to the receiving cavity and close to the hollow main body, the at least one mounting hole is close to the inner top surface, and the filter is positioned on the inner top surface; and
wherein the at least one mounting hole comprises two opposite mounting holes, the filter is aligned with the two mounting holes.

2. The camera module of claim 1, wherein the lens barrel defines a plurality of outer threads in an outer surface thereof, the main body defines a plurality of inner threads in an inner wall thereof, the outer threads are engaged with the inner threads.

3. The camera module of claim 1, wherein the at least one mounting hole is sealed with bond materials.

* * * * *